United States Patent
Sasazaki et al.

(10) Patent No.: US 9,451,244 B2
(45) Date of Patent: Sep. 20, 2016

(54) CONNECTING A PROJECTION-TYPE DISPLAY SYSTEM TO AN OPENING AND CLOSING DEVICE

(71) Applicant: Sony Corporation, Tokyo (JP)

(72) Inventors: Yukihiro Sasazaki, Tokyo (JP); Masaaki Mizoe, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/680,632

(22) Filed: Apr. 7, 2015

(65) Prior Publication Data

US 2015/0288954 A1 Oct. 8, 2015

Related U.S. Application Data

(63) Continuation of application No. 13/295,607, filed on Nov. 14, 2011, now Pat. No. 9,016,864.

(30) Foreign Application Priority Data

Nov. 19, 2010 (JP) ................................ 2010-259464

(51) Int. Cl.
*H04N 13/04* (2006.01)
*G03B 21/26* (2006.01)
*G02B 27/22* (2006.01)
(Continued)

(52) U.S. Cl.
CPC ...... *H04N 13/0438* (2013.01); *G02B 27/2264* (2013.01); *G03B 21/26* (2013.01); *G03B 35/24* (2013.01); *H04N 13/0459* (2013.01); *H04N 13/0497* (2013.01); *G09G 3/003* (2013.01); *G09G 5/003* (2013.01)

(58) Field of Classification Search
CPC .................... H04N 13/0438; H04N 13/0497; G02B 27/2264; G03B 21/26
USPC .................... 353/7; 348/53, 55, 56; 359/464
See application file for complete search history.

(56) References Cited

U.S. PATENT DOCUMENTS

| 5,821,989 A | 10/1998 | Lazzaro et al. |
| 6,088,052 A | 7/2000 | Guralnick |

(Continued)

FOREIGN PATENT DOCUMENTS

| JP | 9-9299 | 1/1997 |
| JP | 10-164114 | 6/1998 |

OTHER PUBLICATIONS

Office Action dated Apr. 8, 2014 for Japanese Application No. 2010-259464.

(Continued)

*Primary Examiner* — Bao-Luan Le
(74) *Attorney, Agent, or Firm* — Wolf, Greenfield & Sacks, P.C.

(57) ABSTRACT

A projection-type display system includes: a projection-type display apparatus that alternately switches images for the left eye and images for the right eye and projects the images onto an object; and an opening and closing control device that receives a control signal based on the display states of the images projected onto the object by the projection-type display apparatus and controls switching apertures of stereoscopic image viewing glasses corresponding to left and right eyes, wherein the projection-type display apparatus is connected to one end of a LAN cable and the opening and closing control device is connected to the other end of the LAN cable.

13 Claims, 8 Drawing Sheets

(51) Int. Cl.
  *G03B 35/24* (2006.01)
  *G09G 3/00* (2006.01)
  *G09G 5/00* (2006.01)

(56) References Cited

U.S. PATENT DOCUMENTS

| | | | |
|---|---|---|---|
| 6,678,091 B2 | 1/2004 | Tropper | |
| 7,072,110 B2 | 7/2006 | Palovuori | |
| 7,114,809 B2 | 10/2006 | Palovuori | |
| 7,508,485 B2 * | 3/2009 | Jacobs | G03B 35/16 352/62 |
| 8,179,427 B2 | 5/2012 | Nemeth | |
| 8,269,822 B2 * | 9/2012 | Zalewski | A63F 13/00 348/56 |
| 8,441,525 B2 | 5/2013 | Masuda et al. | |
| 8,542,326 B2 | 9/2013 | MacNaughton et al. | |
| 8,564,649 B2 | 10/2013 | Shigyo et al. | |
| 8,670,025 B2 * | 3/2014 | Hasegawa | G02B 27/0093 348/55 |
| 8,746,887 B2 * | 6/2014 | Shestak | G03B 21/006 353/7 |
| 2001/0043266 A1 * | 11/2001 | Robinson | G02B 27/2264 348/53 |
| 2004/0233276 A1 | 11/2004 | Palovuori | |
| 2004/0233527 A1 | 11/2004 | Palovuori | |
| 2008/0043203 A1 * | 2/2008 | Jacobs | G03B 35/16 352/63 |
| 2009/0051759 A1 | 2/2009 | Adkins et al. | |
| 2009/0322861 A1 | 12/2009 | Jacobs et al. | |
| 2010/0026794 A1 | 2/2010 | Chang | |
| 2010/0079585 A1 | 4/2010 | Nemeth et al. | |
| 2010/0188489 A1 * | 7/2010 | Mashitani | G02B 27/2228 348/53 |
| 2010/0194857 A1 * | 8/2010 | Mentz | G02B 27/2264 348/43 |
| 2010/0225751 A1 | 9/2010 | Nemeth | |
| 2010/0315316 A1 | 12/2010 | Mihara et al. | |
| 2011/0001805 A1 * | 1/2011 | Mentz | H04N 13/0438 348/55 |
| 2011/0001808 A1 * | 1/2011 | Mentz | H04N 13/0438 348/59 |
| 2011/0019152 A1 * | 1/2011 | Shestak | G03B 21/006 353/7 |
| 2011/0050867 A1 * | 3/2011 | Hasegawa | G02B 27/0093 348/55 |
| 2011/0090324 A1 * | 4/2011 | Mentz | H04N 13/0438 348/55 |
| 2012/0019636 A1 | 1/2012 | Gefen et al. | |
| 2012/0127434 A1 | 5/2012 | Sasazaki et al. | |
| 2014/0139649 A1 * | 5/2014 | Hasegawa | G02B 27/0093 348/51 |

OTHER PUBLICATIONS

Fujiwara, Keyword is D, HiVi. October Version, Japan, Stereo Sound Publishing Inc. Sep. 17, 2010;28(10):74-7.
Oohashi, Scoop! Autumn "Super" Big Event Triple Torrent !!. AV Review, October Version. Japan, Ongen Publishing Co., Ltd. Oct. 25, 2010;27(10):22-7.

* cited by examiner

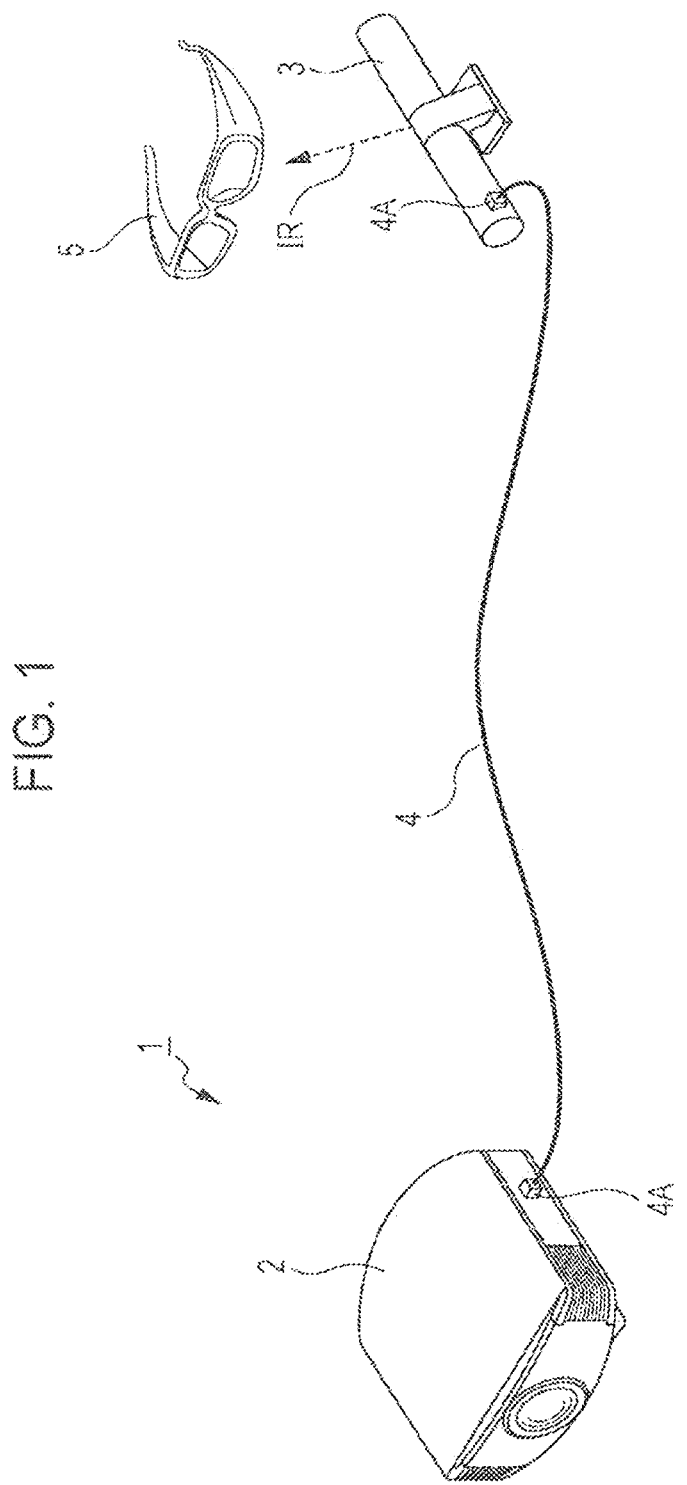

CONNECTING A PROJECTION-TYPE DISPLAY SYSTEM TO AN OPENING AND CLOSING DEVICE

CROSS-REFERENCE TO RELATED APPLICATION

This application is a continuation of and claims the benefit under 35 U.S.C. §120 of U.S. patent application Ser. No. 13/295,607, titled "CONNECTING A PROJECTION-TYPE DISPLAY SYSTEM TO AN OPENING AND CLOSING DEVICE," filed on Nov. 14, 2011, which claims the benefit under 35 U.S.C. §119 of Japanese Patent Application No. 2010-259464, filed on Nov. 19, 2010, each of which is hereby incorporated by reference in its entirety.

BACKGROUND

The present disclosure relates to projection-type display systems in which, for example, a projection-type display apparatus suspended from a ceiling is used to enjoy stereoscopic images.

There is provided a projection-type display system (projector system) that projects (casts) images on a screen in front of a user and allows the user to recognize the images three dimensionally (stereoscopically). In such a projector system, a projection-type display apparatus (projector apparatus) alternately displays images for the left eye and images for the right eye with a predetermined period, for example, with a field period. The images displayed as described above are enjoyed by the user who uses glasses for viewing stereoscopic images (referred to as stereoscopic image viewing glasses hereinafter) such as liquid crystal shutter glasses having switching apertures corresponding to left and right eyes that are controlled so that they are opened or closed in synchronization with the display states of the images for the left eye and for the right eye (Refer to Japanese Unexamined Patent Application Publication No. 09-9299, for example).

As a method of supplying the signal for controlling opening and closing of the switching apertures (referred to as a synchronization signal hereinafter) to the glasses for viewing stereoscopic images, typically employed is a method in which an emitting device (opening and closing control device) connected to the projector apparatus transmits infrared rays including the synchronization signal to the stereoscopic image viewing glasses.

SUMMARY

In the related art, a USB (universal serial bus) cable in conformity with the USB standard or a dedicated fixed-length cable has been utilized for transmitting the synchronization signal from the projector apparatus to the emitting device.

Because the length of the USB cable is limited to 5 meters at a maximum by the standard, it is difficult to connect the projector apparatus to the emitting device with the use of the USB cable depending on circumstances, with the result that the synchronization signal is not transmitted from the projector apparatus to the emitting device. For example, in the case where three dimensional images provided by a television receiver (referred to as a TV set hereinafter) are observed, there will be no problem with the length of a cable because the TV set is situated very close to an emitting device. On the other hand, in the case where three dimensional images are provided by a projector apparatus, the projector apparatus projects the images from a user side to a screen set up opposite to the user. For example, it will be assumed that a projector apparatus that is suspended from a ceiling (so called suspended projector) situated at the rear of a user projects images to a screen situated in front of the user. In this case, the distance between the projector apparatus and the emitting device becomes larger, a longer cable is necessary to connect them. In large facilities, such as a movie theater, the distance between the projector apparatus and the emitting device becomes much larger, therefore a USB cable with its length limited is too short to connect them.

On, the other hand, if a dedicated fixed-length cable is used for transmitting a synchronization signal, because the cable has a fixed length, there is a possibility depending on circumstances that the cable is too long, resulting in a redundant hard-wiring, or that the cable is too short, which makes it difficult to transmit the synchronization signal. Alternatively, if a dedicated fixed-length cable is made so that it may fit to circumstances every time the projector system is installed, the cost of the dedicated fixed-length cable increases.

The present disclosure is achieved with the above-described problems borne in mind, and improves the feasibility of installation of a cable between a projection-type display apparatus and an opening and closing control device.

A projection-type display system according to an embodiment of the present disclosure includes: a projection-type display apparatus that alternately switches images for the left eye and images for the right eye and projects these images onto an object; and an opening and closing control device that receives a control signal based on the display states of the images projected onto the object by the projection-type display apparatus and controls the switching apertures of stereoscopic image viewing glasses corresponding to left and right eyes. Here, the projection-type display apparatus and the opening and closing control device are connected to each other through a LAN (local area network) cable. The projection-type display apparatus transmits the control signal to the opening and closing control device through the LAN cable.

According to an embodiment of the present disclosure, because the projection-type display apparatus and the opening and closing control device are connected to each other through the LAN cable, there is no limitation to the length of the LAN cable unlike the USB cable, therefore a long distance transmission can be realized. In addition, the LAN cable does not have any limitations in terms of hard-wiring unlike a fixed-length cable.

According to an embodiment of the present disclosure, the feasibility of installation of a cable between a projection-type display apparatus and an opening and closing control device can be improved.

BRIEF DESCRIPTION OF THE DRAWINGS

FIG. 1 is a block diagram showing an overall configuration example of a projector system according to a first embodiment of the present disclosure;

DETAILED DESCRIPTION OF EMBODIMENTS

Figure 2C:
FIG. 2A to FIG. 2C are explanatory diagrams showing an example of a LAN cable.

Embodiments of the present disclosure will be described with reference to the attached drawings below. Descriptions about the embodiments will be made regarding the following subjects in the following order. In addition, components common to more than one figure are given the same reference numerals, and repeated redundant descriptions of these components will be omitted.

1. First Embodiment (an embodiment in which only a LAN cable is used)

2. Second Embodiment (an embodiment in which a LAN cable, a dedicated cable, and a conversion cable located between the LAN cable and the dedicated cable are used)

1. First Embodiment

Outline of Projector System

Figure 2B:
Figure 2A:

FIG. 1 is a block diagram showing an overall configuration example of a projector system (projection-type display system) according to a first embodiment of the present disclosure. FIG. 2A to FIG. 2C show an example of a LAN cable used in the projector system according to the first embodiment of the present disclosure. FIG. 2A is a side view of a LAN plug installed at one end of the LAN cable, FIG. 2B is a top view of the LAN cable, and FIG. 2C is a side view of a LAN plug installed at the other end of the LAN cable.

In a projector system 1 according to this embodiment, a projector apparatus 2 (an example of a projection-type display apparatus) and an emitting device 3 (an example of an opening and closing device) are connected to each other through a LAN cable 4 that conforms to the IEEE802.3 standard and the extended version of this standard. The IEEE802.3 standard and the extended version of this standard are referred to as the Ethernet (registered trademark) standard, and they constitute technology standards that are widely used in LANs. A coaxial cable, a fiber-optic cable, or a twist-pair cable can be used as the LAN cable 4. In this specification, Ethernet is a generic name given to Fast Ethernet and Gigabit Ethernet.

The emitting device 3, which is equipped with an infrared LED (light emitting diode), sends infrared rays to stereoscopic image viewing glasses 5 on the basis of a synchronization signal supplied by the projector apparatus 2 through the LAN cable 4.

A LAN plug 4A (male connector) is installed at each end of the LAN cable 4. The LAN plug 4A at one end of the LAN cable 4 is plugged into a socket (female connector) of the projector apparatus 2, and the LAN plug 4A at the other end of the LAN cable 4 is plugged into a socket of the emitting device 3. A cable used in an Ethernet has an 8-wire configuration. To match this 8-wire configuration, a so called "RJ-45" plug that conforms to Registered Jack RJ-45 standard stipulated by the Federal Communications Commission (FCC) is used as the LAN plug 4A. The RJ-45 is an 8-pin plug whose shape is similar to that of an RJ-11 used in telephone circuits.

Because the LAN cable 4 that conforms to the Ethernet standard is employed as means for connecting the projector apparatus 2 and the emitting device 3, a longer cable can be used (that is, the maximum transmission distance becomes longer) compared with a USB cable (whose maximum transmission distance is 5 meters). For example, with the use of 100BASE-T with its maximum communication speed 100 Mbps or 1000BASE-T with its maximum communication speed 1 Gbps (1000 Mbps), the length of a LAN cable can be up to 100 m. In addition, the maximum transmission distance of a LAN cable is stipulated as several hundred meters in an other series of 1000BASE standards, and as a kilometer in the series of 10GBASE standards. In addition, because plural LAN cables that conforms to the Ethernet standard with various lengths are commercially available, a suitable LAN cable can be selected in accordance with the installation environment of a projector system. In addition, in this embodiment, a commercial product can be used as the LAN cable 4, the cost of the LAN cable 4 can be lowered compared with the case where a dedicated fixed-length cable is used.

Figure 3:
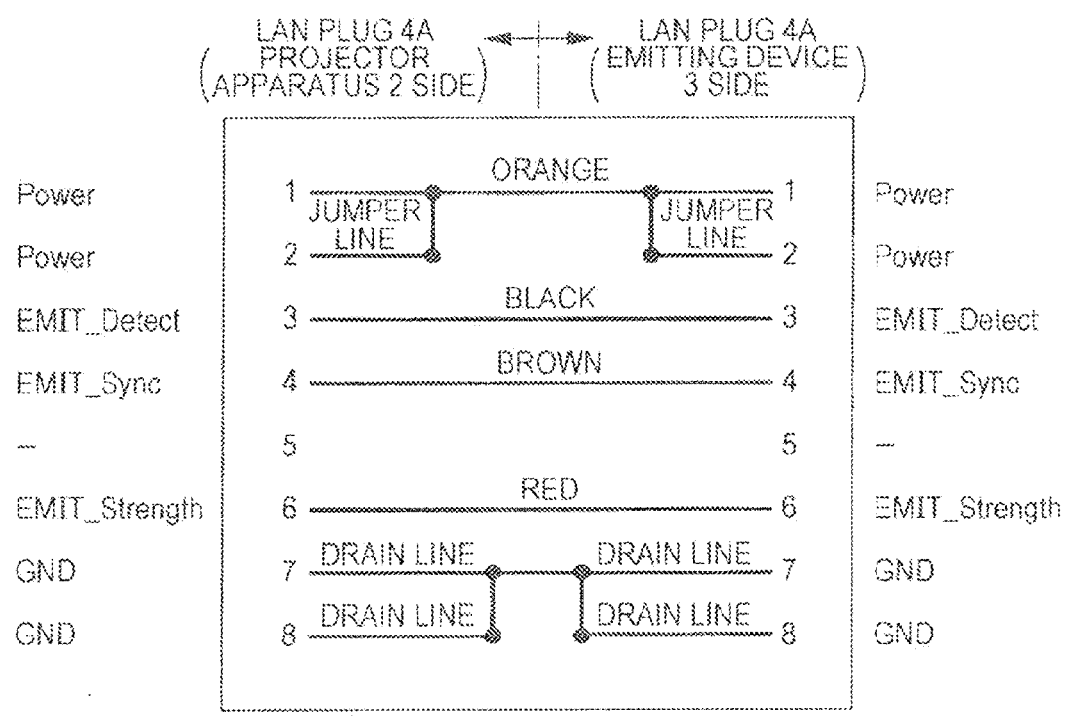
FIG. 3 is an explanatory diagram showing an example of wires inside the LAN cable.

FIG. 3 is an explanatory diagram showing an example of wires inside the LAN cable. Among eight pins of the LAN plug 4A on the projector apparatus 2 side or on the emitting device 3 side, a first pin is connected to an orange wire; a third pin to a black wire; a fourth pin to a brown wire; a sixth pin to a red wire; a seventh pin and an eighth pin are short-circuited with a drain line; a first wire and a second wire are short-circuited with a jumper line; and a seventh wire and a eighth wire are short-circuited with a jumper line. Each of the pins of the LAN plug 4A on the projector apparatus 2 side is connected to a pin with the same number of the LAN plug 4A on the emitting device 3 side through a line with the same number. In both LAN plugs 4A configured in such a way, electric power (POWER) is supplied to the first pins and the second pins; a detection signal (EMIT_Detect) is transmitted to the third pins; a synchronization signal (EMIT_Sync) is transmitted to the fourth pins; and a strength setting signal (EMIT_Strength) is transmitted to the sixth pins. In addition, the seventh pins and the eighth pins are connected to ground (GND).

The detection signal (EMIT_Detect) is used to inform the projector apparatus 2 that the emitting device 3 is connected to the LAN cable 4. The detection signal (EMIT_Detect) is high (H) when the LAN plug 4A is not in a state of having been inserted into the socket of the emitting device 3 (in the state of non-insertion), and low (L) when the LAN plug 4A is in a state of having been inserted into the socket of the emitting device 3 (in the state of insertion).

Figure 4:
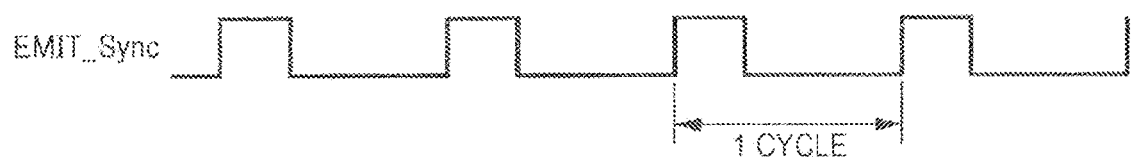
FIG. 4 is a waveform chart of a synchronization signal supplied from a projector apparatus to an emitting device.

In addition, the synchronization signal (EMIT_Sync) determines the opening times of the shutters for the left eye and right eye of the stereoscopic image viewing glasses 5 on the basis of the display states of images for the left eye and images for the right eye. FIG. 4 shows a waveform of the synchronization signal (EMIT_Sync). The synchronization signal (EMIT_Sync) is a rectangular wave with a predetermined duty ratio (time ratio of a pulse width (H period) to one cycle period). By changing this duty ratio, the output of the emitting device 3 is changed, with the result that the opening times of the shutters for the left eye and right eye of the stereoscopic image viewing glasses 5 are changed. In general, only the synchronization signal (EMIT_Sync) for controlling the opening time of the shutter for the left eye is generated, and the synchronization signal for controlling the opening time of the shutter for the right eye is generated by the emitting device 3 or an emitting unit 17 (shown in FIG. 5) that receives the synchronization signal for controlling the opening time of the shutter for the left eye on the basis of the received synchronization signal.

The strength setting signal (EMIT_Strength) is a signal for set the strength of the output of the emitting device 3 (that is, the strength of the output signal of the infrared LED of the emitting device). The level of the strength setting signal is set lower to increase the strength of the output signal of the infrared LED, and the level of the strength setting signal is set higher to decrease the strength of the output signal of the infrared LED.

Configuration Example of Projector Apparatus

Figure 5:
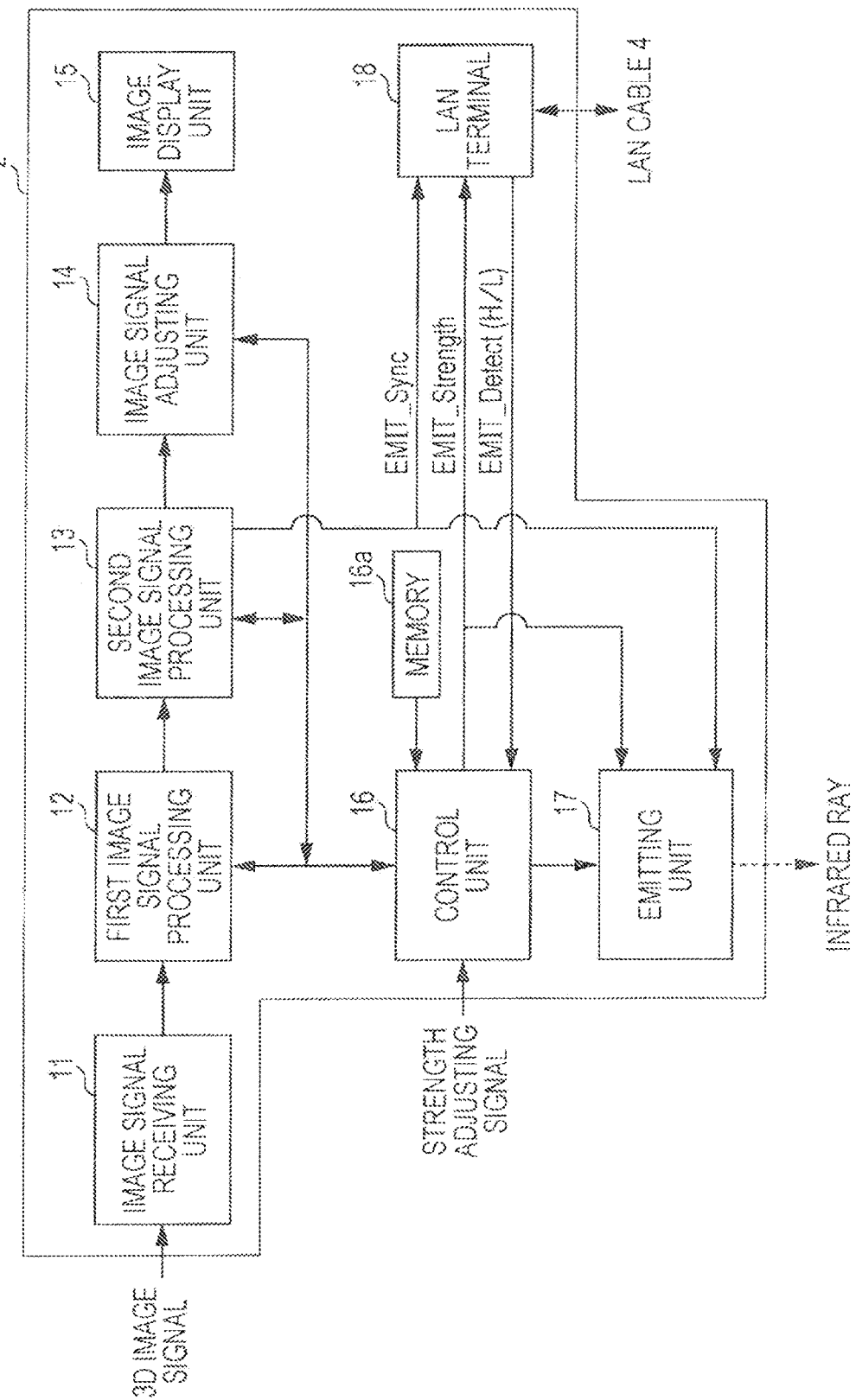
FIG. 5 is a block diagram showing an internal configuration example of the projector apparatus.

FIG. 5 is a block diagram showing an internal configuration example of the projector apparatus 2. The projector apparatus 2 includes an image signal receiving unit 11, a first image signal processing unit 12, a second image signal processing unit 13, an image signal adjusting unit 14, an image display unit 15, a control unit 16, an emitting unit 17, and a LAN terminal 18.

The image signal receiving unit 11 is a unit for receiving three-dimensional image signals (referred to as 3D image signals hereinafter), and conforms to an HDMI (high-definition multimedia interface) standard, for example. The HDMI standard is a digital image and audio I/O interface standard that allows simultaneous transmission of image signals, audio signals, and control signals. In addition, HDMI is used for decoding compressed 3D image signals. The 3D image signals are supplied from, for example, a hard disk drive, a Blu-ray recorder ("Blu-ray" is a trademark), a personal computer, or a network (through so-called streaming delivery). In this embodiment of the present disclosure, it will be assumed that the 3D signals supplied to the projector apparatus 2 include image signals, audio signals, and control signals.

The first image signal processing unit 12 performs signal processing such as interlace/progressive conversion and scaling that changes the size of a screen on 3D signals sent from the image signal receiving unit 11, and then transmits the processed 3D signals to the second image signal processing unit 13.

The second image signal processing unit 13 performs stereoscopic image processing on the 3D image signals sent from the first image signal processing unit 12, and then transmits the processed 3D signals to the image signal adjusting unit 14. In addition, the second image signal processing unit 13 generates a synchronization signal (EMIT_Sync) for the 3D signals sent to the image signal adjusting unit 14, and then transmits the synchronization signal to the emitting unit 17 or the LAN terminal 18. Although the stereoscopic image processing is performed in conformity with, for example, a frame rate of 120 Hz, it is performed on the basis of 240 Hz driving. However, a frame rate and a driving frequency used in this stereoscopic processing are not limited to this frame rate of 120 Hz and this driving frequency of 240 Hz respectively.

The image signal adjusting unit 14 performs 3D gamma adjustment, an adjustment of a LUT of display panel gamma, and the like on the 3D image signals sent from the second image signal processing unit 13, and then sends the adjusted 3D signals to the image display unit 15. The 3D image signals sent to the image display unit 15 have 1920 scanning lines-by-1080 scanning lines (the number of horizontal scanning lines by the number of vertical scanning lines), for example.

The image display unit 15 displays images corresponding to the 3D image signals supplied by the image signal adjusting unit 14, and a liquid crystal panel can be used as the image display unit 15, for example. The image display unit 15 drives display of the images on the basis of a control signal (synchronization signal) included in the 3D image signals. For example, the image display unit 15 drives display of the images with use of a frequency of 240 Hz, and projects the images by alternately switching between the images for the left eye and for the right eye.

The control unit 16 controls each block in the projector apparatus 2, and an arithmetic processing unit, such as a CPU (central processing unit), is used as the control unit 16. The control unit 16 reads out a control program stored in a nonvolatile memory 16a to a RAM (random access memory), which is not shown in FIG. 5, and executes the control program. The detection signal (EMIT_Detect) is sent to the control unit 16 from the LAN terminal 18. The control unit 16 determines to which the synchronization signal (EMIT_Sync) is supplied, the emitting unit 17 or the emitting device 3, that is, the LAN terminal 18 on the basis of this detection signal (EMIT_Detect). Only one of the emitting unit 17 and the emitting device 3, that is, the LAN terminal 18, is selected as shown in Table. In addition, when the control unit 16 receives a strength adjusting signal generated by the operation unit (not shown), which is installed in the projector apparatus 2, owing to a user's operation, the control unit 16 sends the strength setting signal (EMIT_Strength) to either of the emitting unit 17 and the LAN terminal 18 on the basis of the strength adjusting signal. Alternatively, the strength adjusting signal can be supplied to the projector apparatus 2 from a recorder device or a computer device connected to the projector apparatus 2 (neither is shown), or through a network.

TABLE

| Emitting Unit 17 (in the projector apparatus 2) | Emitting Device 3 (external) |
|---|---|
| On | Off |
| Off | On |

The emitting unit 17 is equipped with an infrared LED, and sends infrared rays to the stereoscopic image viewing glasses 5 on the basis of the synchronization signal (EMIT_Sync) supplied from the second image signal processing unit 13.

The LAN terminal 18 is a terminal installed in the socket (female connector). The LAN terminal 18 has eight pins that conform to the Ethernet standard as the LAN plug 4A, for example, and each pin of the LAN terminal 18 is connected to a corresponding pin of the LAN plug 4A.

Example of Operation of Projector System

Figure 6:
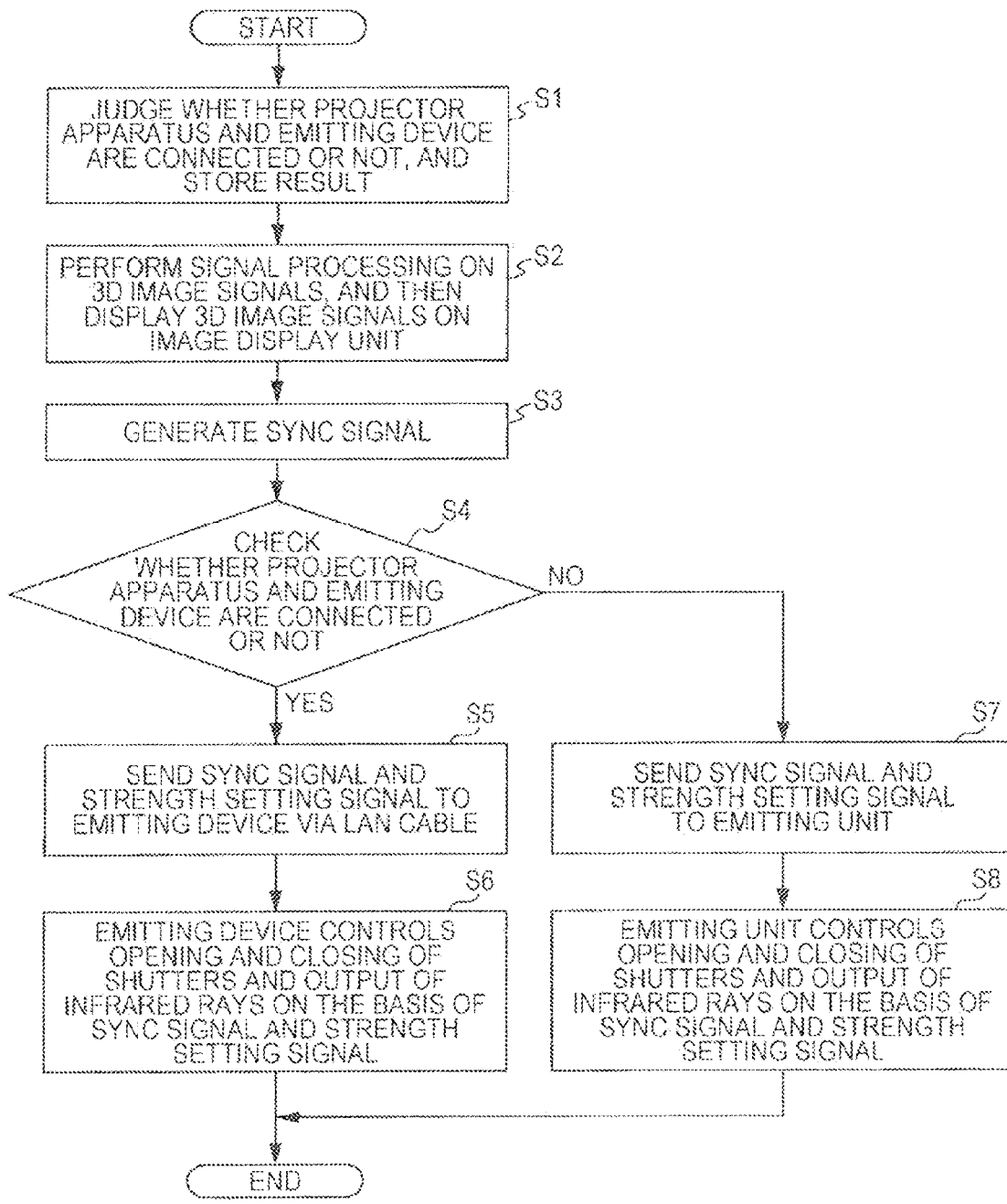
FIG. 6 is a flowchart showing an operation example of the projector system.

Next, the operation of the projector system 1 will be described with reference to a flowchart in FIG. 6. First, the control unit 16 of the projector apparatus 2 detects the detection signal (EMIT_Detect) sent from the LAN terminal 18. Secondly, the control unit 16 judges whether the projector apparatus 2 and the emitting device 3 are connected to each other via the LAN cable 4 on the basis of the detection signal (at step S1), and then stores the judgment result in the RAM or in the memory 16a.

Thirdly, when 3D image signals are received by the image signal receiving unit 11 of the projector apparatus 2, the first image signal processing unit 12 and the second image signal processing unit 13 perform predetermined signal processing on the 3D image signals (at step S2), and then the processed 3D signals are sent to the image signal adjusting unit 14. After a predetermined adjustment is performed on the 3D signals in the image signal adjusting unit 14, images corresponding to the adjusted 3D image signals are displayed on the image display unit 15. At the same time, the second image signal processing unit 13 generates a synchronization signal (EMIT_Sync) corresponding to the 3D image signals (at step S3).

The control unit 16 reads out the judgment result obtained at step S1, and checks whether the judgment result shows that the projector apparatus 2 and the emitting device 3 are connected to each other or not (at step S4). If the projector apparatus 2 and the emitting device 3 are connected to each other, the control unit 16 causes the second image signal processing unit 13 to send the synchronization signal (EMIT_Sync) to the LAN terminal 18. In addition, the control unit 16 sends the strength setting signal (EMIT_Strength) to the LAN terminal 18 (at step S5).

The synchronization signal (EMIT_Sync) and the strength setting signal (EMIT_Strength) that are sent to the LAN terminal 18 are sent to the emitting device 3 via the LAN cable 4. The emitting device 3 sends infrared rays to the stereoscopic image viewing glasses 5 on the basis of the transmitted synchronization signal (EMIT_Sync) and strength setting signal (EMIT_Strength). In other words, the emitting device 3 controls opening and closing of the switching apertures (shutters) for the left eye and right eye of the stereoscopic image viewing glasses 5 on the basis of the synchronization signal, and at the same time adjusts the output strengths of the infrared rays (at step S6).

On the other hand, at step S4, if the projector apparatus 2 and the emitting device 3 are not connected to each other, the second image signal processing unit 13 sends the synchronization signal (EMIT_Sync) to the emitting unit 17. In addition, the control unit 16 sends the strength setting signal (EMIT_Strength) to the emitting unit 17 (at step S7).

The emitting unit 17 sends infrared rays to the stereoscopic image viewing glasses 5 on the basis of the synchronization signal (EMIT_Sync) sent from the second image signal processing unit 13 and the strength setting signal (EMIT_Strength) sent from the control unit 16. In other words, the emitting device 3 controls opening and closing of the switching apertures (shutters) for the left eye and right eye of the stereoscopic image viewing glasses 5, and at the same time adjusts the output strengths of the infrared rays (at step S8).

According to the above-described first embodiment of the present disclosure, because the projector apparatus and the emitting device are connected to each other using the LAN cable, and the synchronization signal is transmitted from the projector apparatus to the emitting device, there is no limitation on the length of the LAN cable unlike in the case of a the USB cable, with the result that a long distance transmission can be realized. In addition, the LAN cable does not have any limitations in terms of hard-wiring unlike with a fixed-length cable. Therefore, the feasibility of installation of a projector system is improved, with the result that a better audiovisual environment can be realized. For example, the projector apparatus and the emitting device can be connected with a cable of the most ideal length a user could think of, therefore the feasibility of installation of the projector system is improved.

In addition, according to the first embodiment, two emitting means, that is, the emitting unit built into the projector apparatus and the external emitting device, can be switched between arbitrarily, which offers greater flexibility in terms of the usage of the projector system. In other words, the projector system according to this embodiment can employ two different projection methods. One is a projection method in which the projector apparatus projects infrared rays onto a screen and stereoscopic image viewing glasses receive the reflected rays (an built-in emitting means type), and the other is a projection method in which an emitting device is set in front of a user, and infrared rays are directly projected onto the stereoscopic image viewing glasses (an external emitting means type). Such a projector system that is capable of employing two emitting means, that is, an emitting means built in a projector apparatus, and an external emitting means, has not been proposed yet.

Here, a USB cable has a 4-wire configuration, and a USB plug has four pins. Therefore, in the related art, it may be difficult for a projector system that uses only a USB cable to transmit three signals, that is, a detection signal (EMIT_Detect), a synchronization signal (EMIT_Sync), and a strength setting signal (EMIT_Strength), whereas the first embodiment of the present disclosure can do this. For example, a projector system of the related art, which uses only a USB cable, does not transmit the strength setting signal (EMIT_Strength). In this embodiment, a projector system can properly adjust the output strengths of infrared rays sent to a stereoscopic image viewing glasses by supplying the strength setting signal (EMIT_Strength) from the projector apparatus to the emitting device.

2. Second Embodiment

A second embodiment of the present disclosure is an example of a projector system in which a projector apparatus and an emitting device are connected to each other with the use of a LAN cable, a dedicated cable, and a conversion cable (junction cable).

Figure 7:
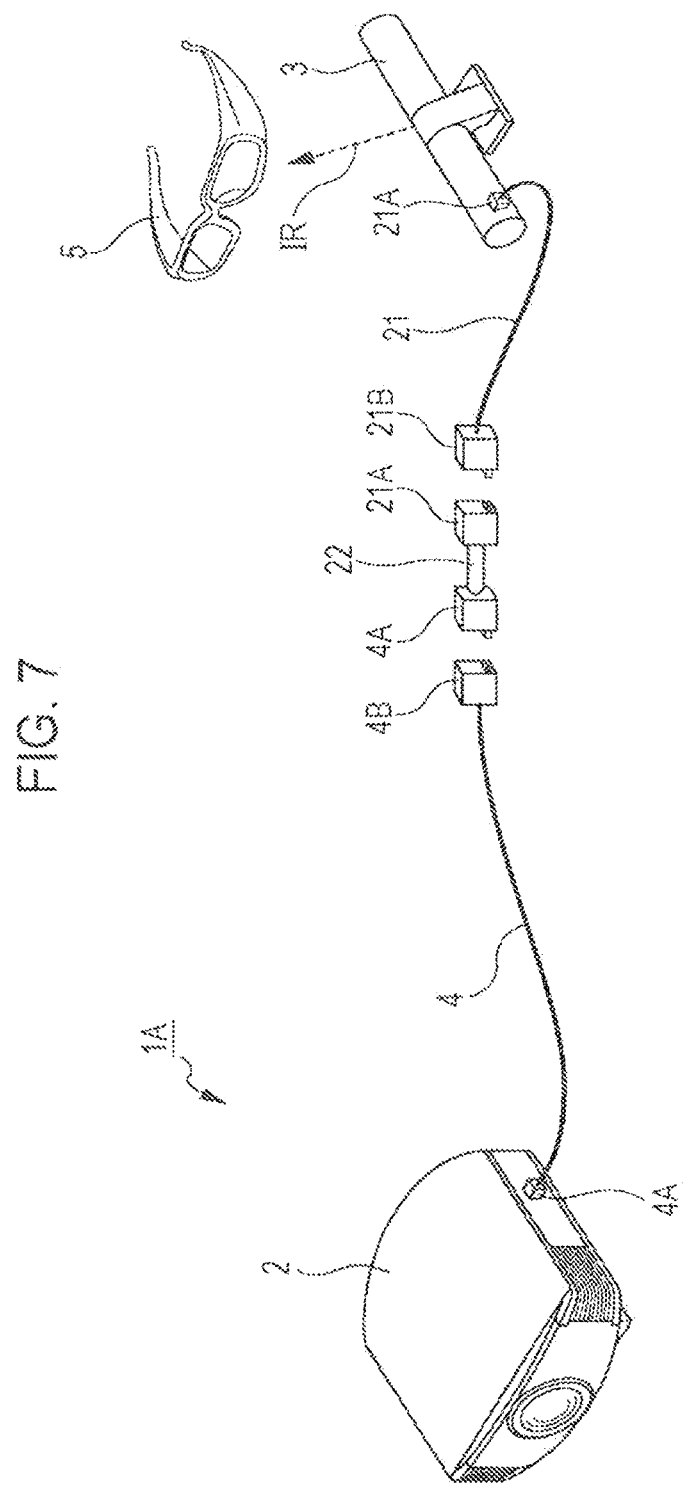
FIG. 7 is a block diagram showing an overall configuration example of a projector system according to a second embodiment of the present disclosure.
Figure 8A:
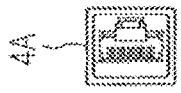
FIG. 8A to FIG. 8C are explanatory diagrams showing an example of a conversion cable.
Figure 8B:
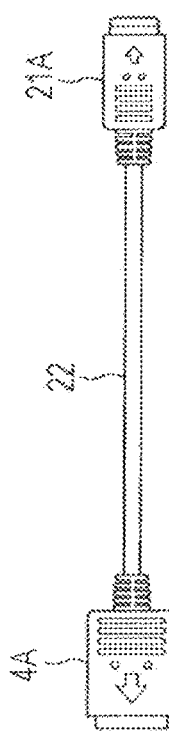
Figure 8C:

FIG. 7 is a block diagram showing an overall configuration example of a projector system according to a second embodiment of the present disclosure. FIG. 8A to FIG. BC show an example of a conversion cable used in the projector system according to the second embodiment of the present disclosure. FIG. 8A is a side view of a LAN plug installed at one end of the conversion cable, FIG. 8B is a top view of the conversion cable, and FIG. 8C is a side view of a dedicated plug installed at the other end of the conversion cable. Components in FIG. 7 and in FIG. 8A to FIG. 8C that are the same as those in FIG. 1 are given the same reference numerals, and detailed descriptions regarding these components will be omitted.

In a projector system 1A, a projector apparatus 2 and an emitting device 3 are connected to each other through a LAN cable 4, a conversion cable 22, and a dedicated cable 21. The LAN cable 4 has a LAN plug 4A for connecting to the projector apparatus 2, and a LAN socket 4B (female connector) for connecting to the conversion cable 22. The dedicated cable 21 is a fixed-length cable used for connecting the projector apparatus 2 of the projector system 1A and the emitting device 3.

The dedicated cable 21 has a dedicated plug 21A for connecting to the emitting device 3, and a dedicated socket 21B (male socket) for connecting to the conversion cable 22. The emitting device 3 has a dedicated socket (dedicated terminal) (female connector), to which the dedicated plug 21A of the dedicated cable is fixed. Each of the dedicated plug and the dedicated socket used for connecting the dedicated cable 21 has a 4-terminal (4-pin) configuration, for example.

The conversion cable 22 has a LAN plug 4A for connecting to the LAN cable 4, and a dedicated plug 21A (female connector) for connecting to the dedicated cable 21. Signals in conformity with the LAN standard are converted to signals in conformity with the standard proprietary to the dedicated cable and vice versa in the conversion cable 22. The LAN plug 4A of the conversion cable 22 is inserted into the LAN socket 4B of the LAN cable 4, and the dedicated plug 21A of the conversion cable 22 is inserted into the dedicated socket 21B of the dedicated cable 21, with the result that the LAN cable 4 and the dedicated cable 21 is joined via the conversion cable 22, and the projector apparatus 2 and the emitting device 3 are connected to each other via the above three cables. In addition, the LAN plug 4A and the dedicated plug 21 A of the conversion cable 22 are depicted in FIG. 8A to FIG. 8C under the assumption that these plugs are covered with protection covers made of resin.

Figure 9:
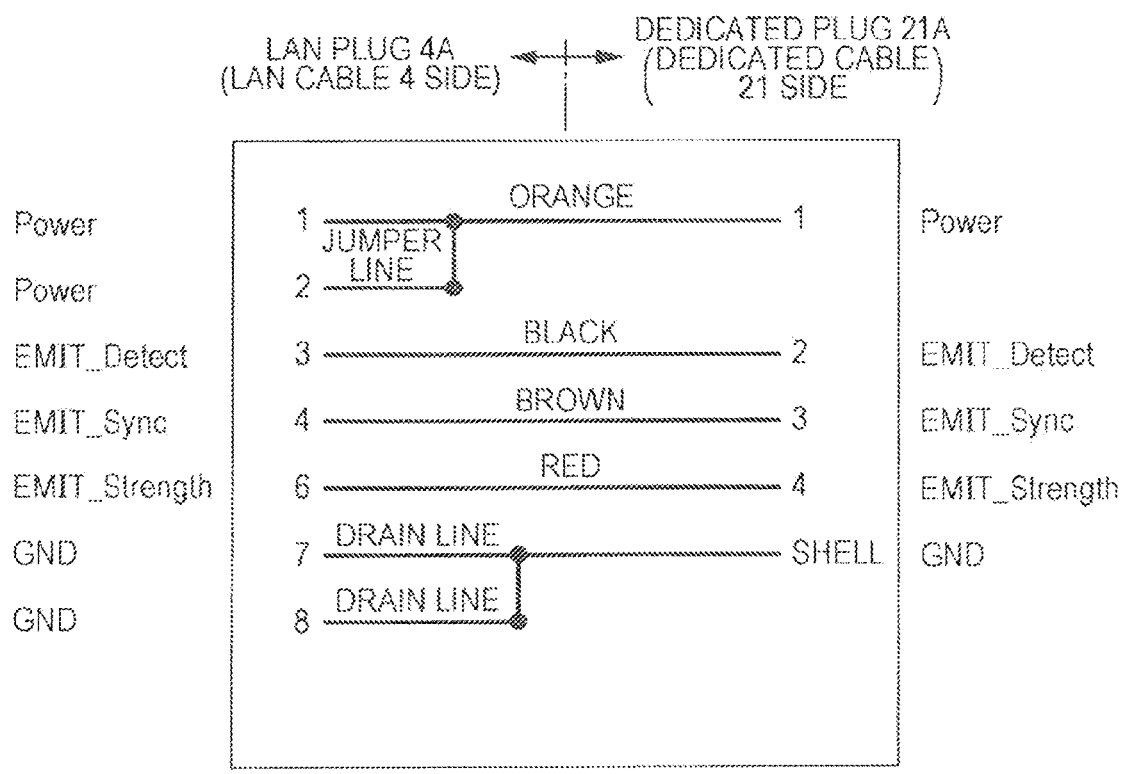
FIG. 9 is an explanatory diagram showing an example of wires inside the conversion cable.

FIG. 9 is an explanatory diagram showing an example of wires inside the conversion cable. The dedicated plug 21A of the conversion cable 22 is a 4-wire plug. In the conversion cable 22, a first pin and a second pin of the LAN plug 4A are connected to a first pin of the dedicated plug 21A with an orange wire, and these pins are supplied with electric power (Power). A third pin of the LAN plug 4A and a second pin of the dedicated plug 21A are connected to each other with a black wire, and the detection signal (EMIT_Detect) is transmitted through these pins. A fourth pin of the LAN plug 4A and a third pin of the dedicated plug 21A are connected to each other with a brown wire, and the synchronization signal (EMIT_Sync) is transmitted through these pins. A sixth pin of the LAN plug 4A and a fourth pin of the dedicated plug 21A are connected to each other with a red wire, and the strength setting signal (EMIT_Strength) is transmitted through these pins. In addition, a seventh pin and a eighth pin of the LAN plug 4A and a shell of the dedicated plug 21A are connected to each other, and these pins and the shell are connected to ground (GND) of the projector apparatus 2 and the emitting device 3.

The above-described second embodiment has functions and advantages similar to those that the first embodiment has. The functions and advantages unique to the second embodiment areas follows. In the second embodiment, the usage of the conversion cable makes it possible that the emitting device equipped with an existing terminal (dedicated socket) is connected to the projector apparatus equipped with the LAN terminal. In this case, because the LAN cable is used between the projector apparatus and the conversion cable, there is no limitation to the distance between the projector apparatus and the emitting device unlike the case where only the dedicated cable is used. In addition, there are no limitations in terms of hard-wiring unlike a fixed-length cable. Therefore, the feasibility of installation of the projector system is improved, with the result that a better audiovisual environment can be realized.

In addition, the description has been made under the assumption that the projector apparatus 2 is equipped with the LAN terminal, and the emitting device 3 is equipped with the dedicated terminal in the above-described embodiment. However, it is obvious that the similar description can be made in the reverse case where the projector apparatus 2 is equipped with the dedicated terminal, and the emitting device 3 is equipped with the LAN terminal.

Although the present disclosure has been described in the above two embodiments, the present disclosure is not limited to the above two embodiments, and it is obvious that various modifications and application examples of the present disclosure may be made as far as they fall within the gist of the disclosure defined in the appended claims.

In addition, the series of processing in the above-described each embodiment can be performed by software as well as hardware. In the case of performing the series of the processing by software, the series of the processing can be performed with the use of a computer equipped with hardware in which programs that constitute the software is embedded, or a computer on which programs for executing necessary functions are installed. For example, a general-purpose computer on which programs that constitute necessary software are installed can be used for performing the series of the processing.

Alternatively, the series of processing can be executed by providing the projector system or the projector apparatus with a recording medium that records program codes of software that realizes functions of the above-described embodiments. Additionally, it goes without saying that after reading out the program codes stored in a recording medium, a computer (or a control device such as a CPU) built in the projector system or the projector apparatus can realize the functions of the above-described embodiments by executing the readout program codes.

In this case, a flexible disk, a hard disk, an optical disk, a magneto-optical disk, a nonvolatile memory card, or a ROM can be used as the recording medium that stores the program codes.

In addition, the functions of the above-described embodiments can be realized when a computer reads out program codes and executes the program codes. On top of that, there is a case where an OS and the like running on the computer performs part or the entirety of the actual processing on the basis of instructions issued by the program codes. The case where the functions of the above-described embodiments are realized as above is to be embraced within the scope of the present disclosure.

In addition, the process steps that are described to be processed in time series in this specification can of course be performed in time series in the above-described order, but these process steps also do not have to be performed in time series. For example, the process steps can include processes carried out in parallel or individually (for example, processes based on parallel processing or based on object-oriented processing).

The present disclosure contains subject matter related to that disclosed in Japanese Priority Patent Application JP 2010-259464 filed in the Japan Patent Office on Nov. 19, 2010, the entire contents of which are hereby incorporated by reference.

What is claimed is:

1. A projection system, comprising:
  a projector configured to project images onto a screen, the images including images for a left eye and images for a right eye, the projector comprising control circuitry and a first transmitter that is built into the projector, the first transmitter being configured to receive a control signal from the control circuitry and emit a first wireless signal that controls shutters of stereoscopic image viewing glasses corresponding to left and right eyes based on the control signal; and
  a second transmitter, located external to the projector, configured to receive the control signal from the control circuitry and emit a second wireless signal that controls the shutters of the stereoscopic image viewing glasses based on the control signal;

wherein the control circuitry is configured to determine whether a user has put the projector in a first state or a second state and is further configured to transmit the control signal to the first transmitter in the case that the projector is determined to be in the first state and to transmit the control signal to the second transmitter in the case that projector is determined to be in the second state.

2. The projection system according to claim 1, wherein the projector is configured to project the images from behind a viewer to in front of the viewer.

3. The projection system according to claim 1, wherein the first and second transmitters are each configured to transmit infrared rays to the stereoscopic image viewing glasses.

4. The projection system according to claim 1, wherein the second transmitter is configured to transmit infrared rays to the stereoscopic image viewing glasses.

5. The projection system according to claim 1, wherein one of the projector and the second transmitter is configured to conform to a standard, the other of the projector and the second transmitter is configured to conform to a proprietary standard, and the projector and the second transmitter are adapted to be connected to each other via a LAN cable, a dedicated cable, and a junction cable that is configured to join the LAN cable and the dedicated cable.

6. The projection system according to claim 5, wherein the standard is a LAN standard.

7. The projection system according to claim 1, wherein:
the projector is disposed within a first housing comprising a first cable terminal; and
the transmitter is disposed within a second housing separate from the first housing and comprising a second cable terminal.

8. The projection system according to claim 7, wherein the first and the second terminals are adapted to allow an operational, hardwired connection to be formed therebetween via at least one LAN cable.

9. The projection system according to claim 8, wherein the operational, hardwired connection comprises a junction cable, configured to join two other cables together.

10. The projection system according to claim 1, wherein the projector and the second transmitter are adapted to be interconnected via a LAN cable.

11. The projection system according to claim 10, further comprising the LAN cable.

12. The projection system according to claim 1, further comprising the stereoscopic image viewing glasses.

13. The projection system according to claim 1, wherein the control circuitry comprises a central processing unit.

* * * * *